Patented Oct. 30, 1928.

1,689,368

UNITED STATES PATENT OFFICE.

KARL STEPHAN, OF BERLIN-CHARLOTTENBURG, GERMANY, ASSIGNOR TO THE FIRM CHEMISCHE FABRIK AUF ACTIEN (VORM. E. SCHERING), OF BERLIN, GERMANY.

PRINTING INK.

No Drawing. Application filed April 14, 1927, Serial No. 183,912, and in Germany May 5, 1926.

My invention refers to printing inks and to a method of making same, and has for its particular object inks which can subsequently be removed from the paper.

It has already been suggested to prepare removable printing inks by admixing to a manganese ink, that is an ink containing a manganese compound, a blue dyestuff soluble in fat, preferably of the kind which can easily be removed by means of sulfites or sulfur dioxide. It has further been suggested to improve such inks by impregnating the manganese pigment with iron tannate. However, when using printing inks prepared with the aid of manganese dioxide it has been found that the types in rotary printing presses were clogged after a few hours' time, whereby considerable disturbances were caused.

I have now ascertained that this drawback must be attributed to the fact that the manganese dioxide employed in the preparation of the ink had too high a specific gravity. The pouring weight i. e. the weight of 100 ccms. of natural pyrolusite when loosely heaped is about 180 grams; 100 ccms. ordinary regenerated pyrolusite when loosely heaped (manganese dioxide) weigh 130–140 grams. I have now found that if the inks are prepared with a manganese dioxide having a still lower pouring weight, such product being obtained, for instance, by conducting the regenerating process with particular care, so that a manganese dioxide is obtained, the pouring weight of which, calculated for 100 ccms. is less than 100 grams, the drawback mentioned above is entirely obviated, for printing inks prepared with the aid of manganese dioxide of this kind are free from all objections.

Manganese dioxide of the kind above described is prepared for instance by precipitating a solution of a manganese salt with a solution of sodium carbonate and introducing chlorine gas until the liquid smells like chloride, whereupon it is filtered and the residue well rinsed and dried. It forms a very loose black powder. This mode of preparing manganese dioxide of particularly light weight is described for instance on page 566, volume 1 of Vanino's "Handbuch der präparativen Chemie".

Example: 25 parts by weight of a manganese dioxide having a pouring weight not exceeding 80 grams are well ground with 74,5 parts of a varnish as used for printing inks and 0,5 parts of a blue dyestuff soluble in fat. The printing ink thus obtained not only has a deep black color and can easily be removed from newspaper, but will even after several hours not clog the types of rotary printing presses.

Various changes may be made in the details disclosed in the foregoing specification without departing from the invention or sacrificing the advantages.

I claim:—

1. As a new composition of matter printing ink comprising manganese dioxide ($MnO_2$), 100 ccms. of which, when loosely heaped, do not weigh more than 100 grams.

2. As a new composition of matter printing ink comprising manganese dioxide ($MnO_2$), 100 ccms. of which, when loosely heaped, weigh about 80 grams.

3. The method of making printing inks comprising mixing a blue dye, which is soluble in fat, and varnish with manganese dioxide ($MnO_2$), 100 ccms. of which, when loosely heaped, do not weigh more than 100 grams.

4. The method of making printing inks comprising mixing 0,5 parts by weight of a blue dye soluble in fat with 74,5 parts varnish and 25 parts of a manganese dioxide, 100 ccms. of which, when loosely heaped, weigh about 80 grams.

In testimony whereof I affix my signature.

KARL STEPHAN.